April 18, 1961 R. C. PERKEY 2,980,173
STARTING CONTROL FOR GAS TURBINE ENGINES
Filed Oct. 24, 1955 3 Sheets-Sheet 1

INVENTOR.
RUSSELL C. PERKEY
BY
R. G. Brodahl
ATTORNEY

April 18, 1961 R. C. PERKEY 2,980,173
STARTING CONTROL FOR GAS TURBINE ENGINES
Filed Oct. 24, 1955 3 Sheets-Sheet 3

INVENTOR.
RUSSELL C. PERKEY
BY
R. M. Brodahl
ATTORNEY

United States Patent Office 2,980,173
Patented Apr. 18, 1961

2,980,173

STARTING CONTROL FOR GAS TURBINE ENGINES

Russell C. Perkey, South Bend, Ind., assignor to The Bendix Corporation, a corporation of Delaware Filed Oct. 24, 1955, Ser. No. 542,340

9 Claims. (Cl. 158—36.3)

This invention relates to a fuel control for a gas turbine engine and more particularly to a fuel control system for use in starting or initiating the operation of a gas turbine engine.

In starting or initiating the operation of a gas turbine engine it is important that the fuel supply manifold for the fuel nozzles be initially filled and supplied with fuel at a very rapid rate. The fuel nozzles should be supplied with fuel as rapidly as can be practically accomplished to permit those fuel nozzles to generate the desired fuel spray into the combustion chambers such that the resultant contact of fuel spray with the igniter will start and support the combustion of the fuel.

Accordingly, it is an object of the present invention to provide an improved starting fuel control for a gas turbine engine.

It is a different object of the invention to provide an improved starting fuel control to facilitate the starting of a gas turbine engine.

It is another object to provide an improved fuel control for a gas turbine engine to enable fuel to be initially supplied to the engine in sufficient quantity to facilitate starting of the engine.

It is a further object to provide an improved fuel control which will be operative to successively and repeatedly start the operation of a gas turbine engine whenever desired and after the operation of that engine has been stopped.

It is still a different object of the present invention to provide an improved engine starting fuel control which will temporarily make the normal operation fuel metering means inoperative until after the engine has been started or until the engine has assumed some predetermined operative condition such as the idle condition.

These and other objects and advantages will be readily apparent from the following detailed description taken in connection with the accompanying drawings wherein.

Figure 1:
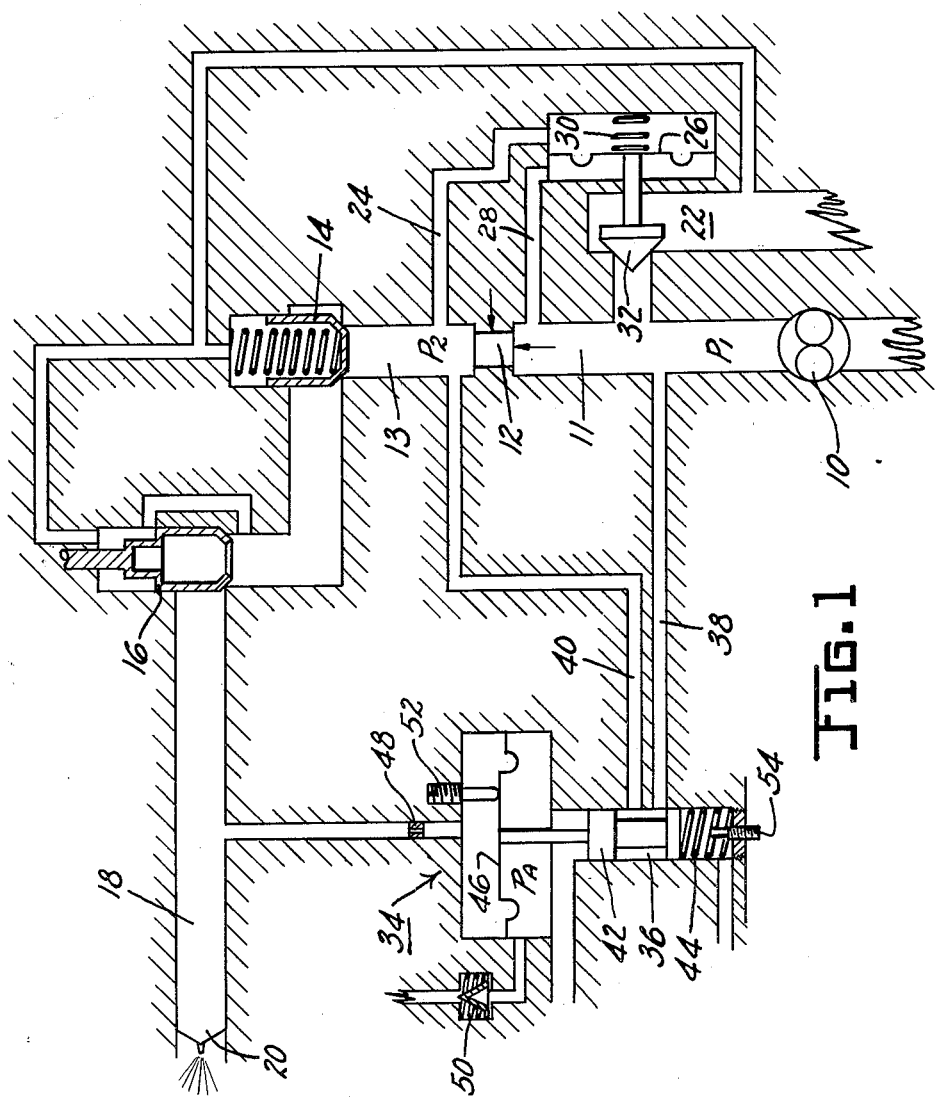
Figure 1 is a partially schematic view showing one modification of the present invention.

In Figure 1 there is shown a main fuel supply pump 10 for providing fuel flow at a pressure $P_1$ to a first main fuel conduit 11 and then to a metering valve unit 12. The fuel passes through the metering valve 12 and into a second main fuel conduit 13 at pressure $P_2$. The fuel passes from the main metering valve 12 through the conventional pressurizing valve 14 and a manual control cut-off valve 16 to a fuel supply manifold 18. A fuel nozzle 20 is shown connected to the fuel supply manifold 18 for supplying the fuel to the combustion chamber (not shown) of the gas turbine engine as well known to persons skilled in this art.

A by-pass valve 22 is provided for a main metering valve 12. A fuel conduit 24 is connected to supply fuel at a pressure $P_2$ to a first side of a control diaphragm 26 within the by-pass valve 22. Another fuel conduit 28 is connected to supply fuel at pressure $P_1$ to the second side of the diaphrgm 26. The spring bias member 30 is operative to provide a predetermined compression force to close the valve member 32 when the fuel pressure $P_1$ is less than a predetermined amount greater than the fuel pressure $P_2$. It is believed that the operation of the illustrated by-pass valve 22 is well known to persons skilled in this art.

A starting fuel control valve member 34 is shown and includes an annular chamber 36 which commonly connects a first starting fuel conduit 38 connected to the fuel at Pressure $P_1$ within the first main fuel conduit 11 and a second starting fuel conduit 40 connected to the fuel at pressure $P_2$ within the second main fuel conduit 13. A movable valve member 42 is connected between a compression spring member 44 and a movable control diaphragm 46 which has a first of its sides exposed to the fuel pressure within the fuel supply manifold 18 through a predetermined bleed orifice 48. The second side of the diaphragm 46 is exposed to atmospheric pressure $P_A$ through a hydraulic fuse member 50 which permits passage of air through ports 51 formed in its spring loaded valve member. An adjustable stop 52 is provided on the first side of the diaphragm member 46 and another adjustable stop 54 is provided for the movable member 42 if the compression of the spring member 44 should go beyond a desired limit.

Figure 2:
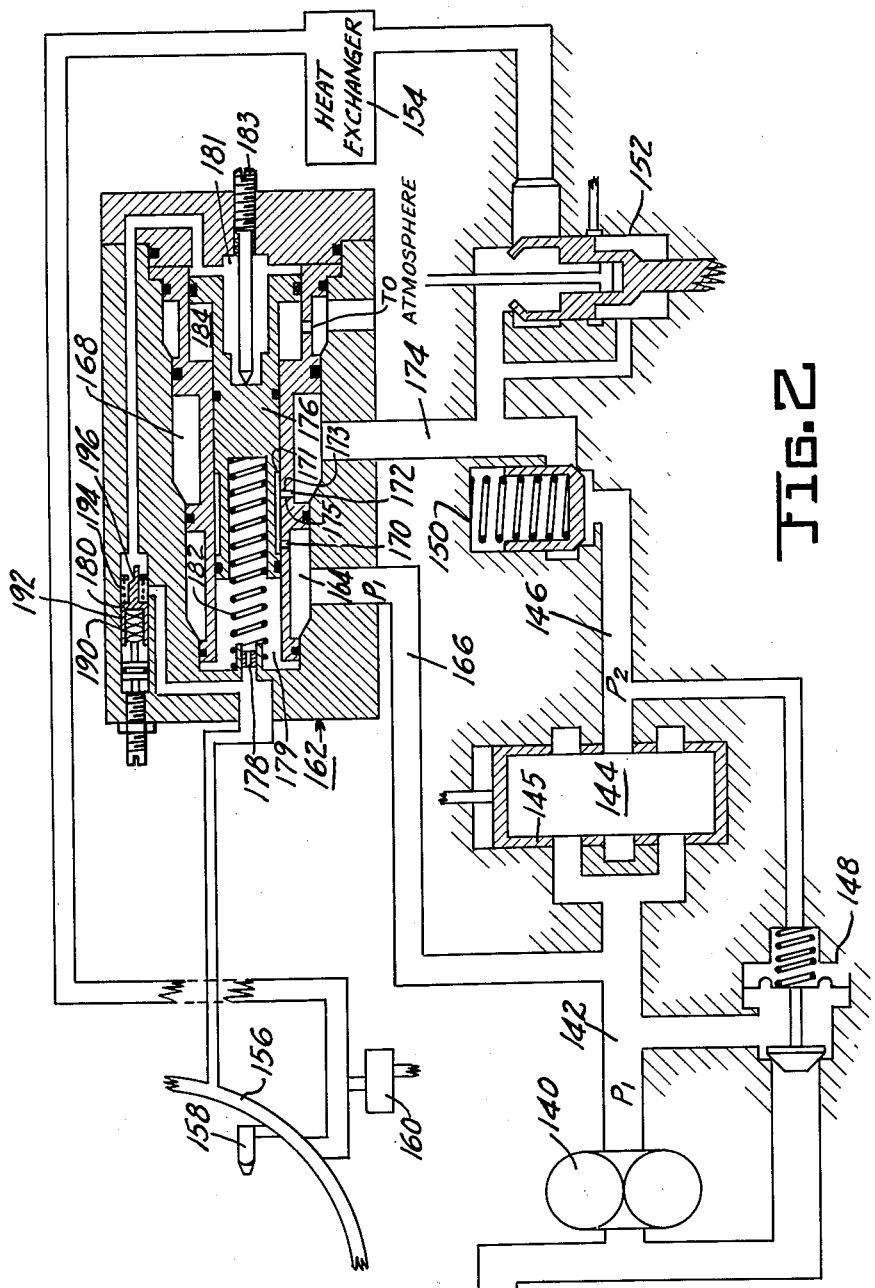
Figure 2 is a schematic view of a second modification of the present invention.

In Figure 2 there is shown a second modification of a starting fuel control system in accordance with the present invention wherein a main fuel pump 140 supplies fuel at a pressure $P_1$ to a first main fuel conduit 142 from which the fuel passes through the main fuel metering valve 144 to a second main fuel conduit 146. The main fuel metering valve 144 is comprised of an inner cylindrical member 145 which is rotated and moved axially to vary the quantity of fuel flowing from conduits 142 to 146. A by-pass valve 148 is provided to control the fuel pressure head or drop across main metering valve 144. The by-pass valve 148 of Figure 2 is similar in operation to the by-pass valve 22 shown in Figure 1. Fuel at pressure $P_2$ passes from the main fuel valve 144 through a pressurizing valve 150 to the cut-off valve 152 which may be manually controlled by the control throttle lever of the pilot. Fuel passes from the cut-off control valve 152 through a heat exchange unit 154 to the fuel supply manifold 156 which is connected to the fuel nozzle 158. The heat exchanger unit 154 is operative to cool the engine oil and/or the hydraulic control oil by the fuel passing through the heat exchanger unit 154 to the fuel supply manifold 156. A conventional drip valve 160 is connected to the fuel supply manifold 156 and is provided to drain the manifold 156 when the cut-off valve 152 is closed.

A starting control valve 162 provides a fuel passage or conduit around the main fuel metering valve 144 for the purpose of starting the engine. The starting valve 162 has a first annular chamber 164 which is connected to the first starting fuel conduit 166. The latter conduit 166 supplies fuel at pressure $P_1$ from the first main fuel conduit 142. A second annular chamber 168 is connected to the first annular chamber 164 through a first starting fuel orifice 170 and a second starting fuel orifice 172. The second annular chamber 168 is connected to supply fuel to the cut-off valve 152 through the second starting fuel conduit 174. Within the starting valve 162 there is a movable valve member 176 which is exposed at a first end to fuel from the fuel supply manifold 156 through a fixed orifice 178 and at its second and opposite end it is supplied fuel from the fuel supply manifold 156 through a variable orifice member 180. The variable orifice member 180 includes a temperature responsive element 190 exposed to the temperature of the fuel passing through the orifice member 180 and which element adjusts the size or area of the orifice opening as well known in this art. The first end of the movable valve member 176, which end is exposed to fuel through the fixed orifice 178, has a lesser area than the second end of the valve member 176 which is exposed to fuel through the variable orifice member 180. The movement of valve member 176 to the left as shown in Figure 2 of the drawing is operative to compress the spring bias member 182 and also acts against atmospheric pressure within the annular chamber 184.

Figure 3:
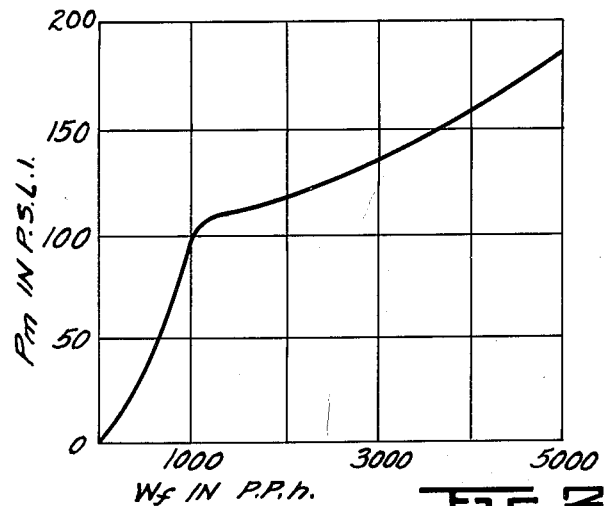
Figure 3 is a graph illustrating the fuel flow through one of the fuel nozzles as a function of fuel pressure in the supply manifold.

In Figure 3 there is shown a graph illustrating the flow of fuel in pounds per hour through the fuel nozzles as a function of the manifold pressure in pounds per square inch.

Figure 4:
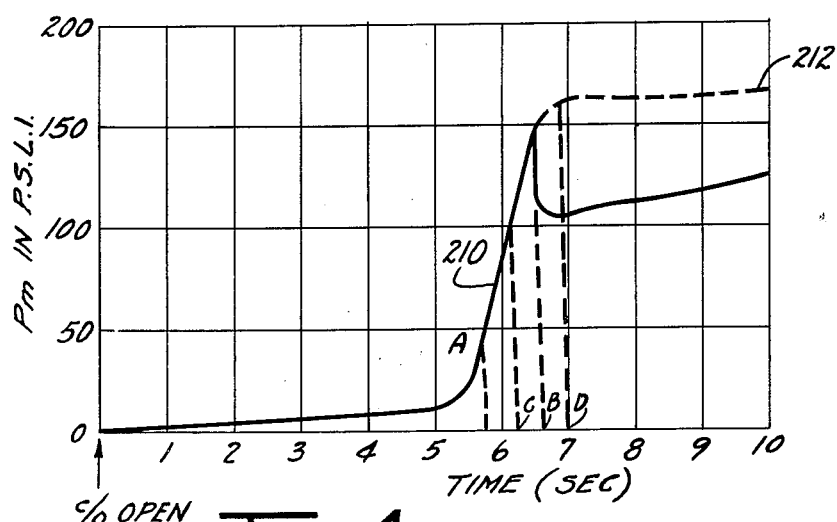
Figure 4 is a graph illustrating the fuel pressure in the fuel supply manifold as a function of time in seconds.

In Figure 4 there is shown a graph illustrating the pressure of a fuel in the manifold in pounds per square inch as a function of time in seconds.

In the operation of the apparatus shown in Figure 1 it is desired that fuel be supplied to fill the fuel supply manifold very rapidly in order that the gas turbine engine may be set in operation as rapidly as is practical. To accomplish this starting valve 42 is initially open to provide a fuel conduit or path around the main metering valve 12 such that the fluid flow restriction within the main metering valve 12 is by-passed. When it is desired to initiate the operation of a gas turbine engine, the engine is first cranked until it reaches approximately 10% to 12% of its maximum speed. Fuel must initially be supplied to fill the fuel supply manifold 18 as rapidly as possible. At this engine speed of about 10% to 12% of maximum speed, the main fuel pump 10 is capable of pumping about 10% of its capacity and the main fuel valve is scheduled or set to pass a lesser quantity of fuel as required for the engine at the above 10% to 12% of maximum engine speed after combustion starts. The starting valve 34 is provided to pass the difference around the main control valve 12 and into the fuel supply manifold 18 until the latter manifold is substantially filled with fuel. For example only, the main fuel pump 10 may be capable of pumping about 4,000 pounds per hour of fuel at about 10% to 12% of the maximum engine speed, and the main fuel valve 12 may be set to pass about 1,200 pounds of fuel per hour. The difference amount of fuel passed by the starting valve 34 then becomes about 2,800 pounds of fuel per hour.

When this condition occurs, the fuel pressure in the fuel manifold 18 causes the movable diaphragm 46 to move the starting valve member 42 against the force of the spring member 44 to block the flow of fuel from the first starting fuel conduit 38 to the second starting fuel conduit 40. When this happens the above mentioned fuel difference passes through the by-pass valve 22 and back to the inlet of the fuel pump 10.

When the engine is shut down by closing the cut-off valve 16, the fuel is drained out of the fuel manifold 18 and this allows the spring member 44 to move the starting valve member 42 to its open position as shown in Figure 1.

Referring to the apparatus of Figure 2, there is shown the main fuel control valve 144 and the starting fuel control valve 162. When the engine is to be started, it is initially cranked to a speed of approximately 10% or 12% of its maximum speed, and at this engine speed the main fuel pump 140 supplies fuel to the control system at the rate of about 10% of its capacity. The main fuel valve 144 is set or scheduled to pass or meter a lesser quantity of fuel at the above engine speed, so the prior art apparatus, without the starting fuel control valve 162 as shown in Figure 2, would by-pass the difference of fuel flow between the quantity of fuel pumped by the fuel pump 140 and the quantity of fuel passed or metered by the main fuel control valve 144 through the by-pass valve 148. However, in accordance with the present invention and as shown in Figure 2, the starting fuel control valve 162 is operative to pass through the orifice members 170 and 172 this difference of fuel flow. The latter difference amount of fuel passes through the starting fuel control valve 162 and through the cut-off valve 152 and into the fuel supply manifold 156, until the fuel pressure builds up within the fuel manifold 156 to a first predetermined pressure. At the latter fuel pressure the fuel passing through the variable control orifice 180 causes the movable valve member 176 to begin moving to the left as shown in Figure 2. This movement of the movable valve member 176 is sufficient when the fuel pressure within the fuel supply manifold 156 reaches a higher and second predetermined pressure to completely shut off the flow of fuel from the first starting fuel conduit 166 to the second starting fuel conduit 174. In other words, the starting fuel control valve 162 passes the difference between pump output and scheduled fuel flow around the main fuel control valve 144 until the pressure within the fuel supply manifold 156 reaches a first predetermined pressure, which starts or triggers the movement of the control valve 162. Then the movable valve member 176 of the starting fuel control valve 162 begins to close and it is operative to completely shut off this flow of starting fuel when the fuel pressure within the manifold reaches a higher and second predetermined pressure level.

In this respect to the first end of the movable valve member 176, as exposed to the control fuel within the chamber 179 and supplied with additional control fuel through the fixed orifice member 178, has been given a predetermined area of substantially 0.5 square inch. The area of the second end of the movable valve member 176 has been predetermined to be approximately 1.5 square inches as exposed to the fuel pressure within the chamber 181. The fuel in the end chamber 181 passes through the temperature variable orifice 180. As the movable valve member 176 begins to move away from the adjustable valve stop member 183 and begins to compress the spring bias member 182, the pressure in the first chamber 179 increases due to the restrictive effect of the fixed orifice member 178, and the pressure in the second chamber 181 decreases such that the movable valve member 176 does not shut off the flow of fuel from the first starting fuel conduit 166 to the second starting fuel conduit 174 until the pressure of the control fuel within the end chamber 181 reaches a predetermined value.

The variable orifice member 180 includes a temperature responsive element 190 such as temperature responsive bi-metal discs and a movable piston member 192 which acts against the force of a compression spring bias member 194. The piston member 192 includes a tapered end portion 196 which moves within the provided orifice opening to effectively vary in response to temperature the variable orifice area to control the flow of fuel therethrough. It has been determined that the necessary manifold pressure build-up may be less for hot day starting than for cold. Inasmuch as under starting conditions the temperature of fuel is normally substantially the same as the ambient air temperature, the above mentioned variable orifice is operative to vary the manifold pressure build-up as a function of fuel temperature and thus adapt the starting flow to suit engine operating requirements. For example, the variable orifice area is varied such as to require about 0.9 second for 0.375 cubic inch of fuel to pass through the variable orifice member 180 at a difference pressure across the orifice member 180 of about 100 pounds per square inch and a plus 60° F. ambient or fuel temperature. The 0.375 cubic inch amount of fuel is necessary within the second end chamber 181 to move the movable valve member 176 to the left a sufficient distance, against the action of the compressor bias spring member 182 and against the fuel within the first end chamber 179 and against the atmospheric pressure $P_A$ in the annulus 184, such that the first starting fuel conduit 166 is shut off from the second starting fuel conduit 174.

By way of example only and not as a limitation on the operation of the apparatus shown in Figure 2, when the pressure in the fuel manifold 156 reaches approximately 40 pounds per square inch, the force exerted on the second end of the movable valve member 176 by the control fuel within the end chamber 181, acting against the force of the control fuel within the first end chamber 179 and the compression spring bias member 182 and the atmospheric pressure $P_A$ within the chamber 184, is sufficient to start the movement of the movable valve member 176 to the left as shown in Figure 2. The rate of this movement is controlled by the temperature responsive variable orifice member 180.

Figure 3 shows the fuel flow versus manifold fuel pressure relationship for a typical jet engine dual or duplex type of fuel nozzle. It is this type of fuel nozzle that operates in accordance with the fuel manifold pressure curves shown in Figure 4.

With reference to the curve shown in Figure 4 it can be seen that the time period required for the starting valve 162 of Figure 2 to fully close, determines the upper fuel pressure level reached within the fuel manifold 156. The curve 210 represents the actual manifold pressures reached when controlling fuel at plus 60° F. temperature. At point A on curve 210 corresponding to a fuel manifold pressure of 40 pounds per square inch, the movable valve member 176 of the starting control valve 162 starts to move to the left. The flow of starting fuel is not restricted or changed until the valve shoulder 171 of the movable valve member 176 reaches and starts to move past the right hand side 173 of the orifice member 172. When the valve shoulder 171 reaches the left hand side 175 of the orifice member 172 the flow of starting fuel through the starting valve 162 ceases. This corresponds to time B as shown in Figure 4, for a fuel temperature of about plus 60° F.

The dotted and substantially level curve portion 212 shown in Figure 4 represents the upper limit or flow capacity of the fuel pump 140 shown in Figure 2.

At an ambient or fuel temperature of about a minus 65° F. the orifice area of the variable orifice member 180 is such as to require about 1.2 seconds of time for the required 0.375 cubic inch of control fuel to pass into the second end chamber 181 to cause the starting fuel control valve 162 to shut off the flow of starting fuel around the main fuel control valve 144. For this temperature the flow of starting fuel ceases at time D as shown in Figure 4. As a still further example to illustrate the operation of the temperature variable orifice member 180, at an ambient or fuel temperature of about plus 120° F., the orifice area of this member becomes such as to require about 0.5 second for the required 0.375 cubic inch of control fuel to pass into the second end chamber 181 to thereby shut-off the flow of starting fuel to the fuel supply manifold 156. For this temperature the flow of starting fuel ceases at time C shown in Figure 4.

This present invention contemplates the use of known types of servo mechanisms where needed to provide power operation.

Although only three embodiments of the present invention have been schematically illustrated and described it will be apparent to those persons skilled in the art that various changes in the form and relative arrangements of the parts may be made to suit individual requirements without departing from the spirit and scope of the present invention.

I claim:

1. In a fuel control system for a gas turbine engine, a fuel manifold, a first fuel conduit connected to said manifold, a first fuel control valve in said first conduit, a second fuel conduit connected to said manifold, a second fuel control valve in said second conduit, with the second fuel control valve being responsive to the fuel pressure in said manifold to vary the flow of fuel through the second fuel conduit, said second fuel control valve including a movable member having first and second side portions, a fixed orifice member connected to supply fuel from said manifold to said first side portion of the movable member, and a variable orifice member connected to supply fuel from said manifold to said second side portion of the movable member.

2. In a fuel control system for a gas turbine engine, a fuel manifold, a first fuel conduit connected to said manifold, a first fuel control valve in said first conduit, a second fuel conduit connected to said manifold, a second fuel control valve in said second conduit, with the second fuel control valve being responsive to the fuel pressure in said manifold to vary the flow of fuel through the second fuel conduit, said second fuel control valve including a movable member having first and second side portions, a fixed orifice member connected to supply fuel from said manifold to said first side portion of the movable member, and a variable orifice member connected to supply fuel from said manifold to said second side portion of the movable member, with said variable orifice member being temperature responsive.

3. The fuel control system of claim 2, with the variable orifice member being responsive to the temperature of the fuel passing through said variable orifice member.

4. In a fuel control system for a gas turbine engine, a fuel manifold, a first fuel conduit connected to said manifold, a first metering valve in said first conduit, a second conduit in parallel flow relationship with said first conduit and connected to said manifold, a second valve in said second conduit and operative when in an open position to by-pass fuel around said first valve, a differential area piston connected to said second valve and operative to position said second valve in an open or a closed position, first fluid passage means connectively interposed between said fuel manifold and the smaller side of said differential area piston, second fluid passage means including a fuel temperature responsive variable orifice therein connectively interposed between said fuel manifold and the larger side of said differential area piston, spring means biasing said differential area piston in a normally open position.

5. In a fuel control system for a gas turbine engine having a fuel manifold, the combination of first and second conduits in parallel flow relationship for supplying fuel to said manifold, metering valve means operative with said first conduit for regulating the supply of fuel therethrough, a normally open starting valve operative with said second conduit, means connected to said starting valve and adapted to be connected to said manifold to transmit manifold fuel pressure that is operative to close said starting valve, temperature means responsive to the temperature of fuel transmitted by said latter named means and operative to restrict the flow of fuel from said manifold to said starting valve as a function of fuel temperature.

6. In a fuel control system for a gas turbine engine having a fuel manifold and control means for supplying a regulated quantity of fuel to said manifold, the combination of first conduit means by-passing said control means, valve means in said conduit means having an open and a closed position, a spring operative with said valve means to bias said valve means in an open position, second conduit means connected to said valve means and adapted to be connected to said manifold for transmitting fuel from said manifold to said valve means that is operative upon reaching a predetermined pressure valve to actuate said valve means to its closed position, a bleed in said second conduit to restrict the flow of fluid therethrough and increase the time necessary for said fuel to obtain said predetermined pressure value.

7. In a fuel control system for a gas turbine engine having a fuel manifold, the combination of a first conduit for supplying fuel to said manifold, valve means in said first conduit movable between an open and a closed position and having a small and a large surface on opposite ends thereof, spring means for biasing said valve means in an open position, a first and a second chamber communicating with said small and said large surfaces respectively, second conduit means adapted to be connected to said manifold and connected to said first chamber to transmit manifold pressure fuel operative to act on said small surface and further bias said valve means in said open position, third conduit means adapted to be connected to said manifold and connected to said second chamber to transmit manifold pressure fuel operative to act on said large surface and bias said valve means towards said closed position.

8. The fuel control system of claim 7, including a restrictive orifice in said third conduit for delaying the transmission of manifold pressure fluid from said manifold to said second chamber.

9. The fuel control system of claim 8 wherein said restrictive orifice is variable in size and including temperature means responsive to fuel temperature operative to vary the size of said orifice.

References Cited in the file of this patent

UNITED STATES PATENTS

| | | |
|---|---|---|
| 1,824,952 | Graham et al. | Sept. 29, 1931 |
| 2,238,110 | Guild | Apr. 15, 1941 |
| 2,564,127 | Orr | Aug. 14, 1951 |
| 2,592,945 | Odell | Apr. 15, 1952 |
| 2,596,815 | Keil | May 13, 1952 |
| 2,606,066 | Thompson | Aug. 5, 1952 |
| 2,667,742 | Kuzmitz | Feb. 2, 1954 |
| 2,674,847 | Davies | Apr. 13, 1954 |
| 2,723,006 | Wyeth | Nov. 8, 1955 |
| 2,758,638 | Lawrence | Aug. 14, 1956 |
| 2,780,055 | Bristol | Feb. 5, 1957 |

FOREIGN PATENTS

| | | |
|---|---|---|
| 718,104 | Great Britain | Nov. 10, 1954 |

UNITED STATES PATENT OFFICE
CERTIFICATE OF CORRECTION

Patent No. 2,980,173                        April 18, 1961

Russell C. Perkey

It is hereby certified that error appears in the above numbered patent requiring correction and that the said Letters Patent should read as corrected below.

Column 3, line 27, after "this" insert -- the --; column 6, line 73, for "valve" read -- value --.

Signed and sealed this 10th day of October 1961.

(SEAL)
Attest:

ERNEST W. SWIDER
Attesting Officer

DAVID L. LADD
Commissioner of Patents

USCOMM-DC